(12) United States Patent
Dipl.-Ing.

(10) Patent No.: US 6,402,462 B1
(45) Date of Patent: Jun. 11, 2002

(54) CENTRIFUGAL PUMP WITH A FLOATING RING SEAL

(75) Inventor: Jürgen Aenis Dipl.-Ing., Radolfzell (DE)

(73) Assignee: Allweiler AG, Radolfzell (DE)

(*) Notice: Subject to any disclaimer, the term of this patent is extended or adjusted under 35 U.S.C. 154(b) by 0 days.

(21) Appl. No.: 09/508,880

(22) PCT Filed: Nov. 16, 1998

(86) PCT No.: PCT/EP98/07315

§ 371 (c)(1),
(2), (4) Date: Jun. 16, 2000

(87) PCT Pub. No.: WO99/25981

PCT Pub. Date: May 27, 1999

(30) Foreign Application Priority Data

Nov. 17, 1997 (DE) .......................................... 197 50 882
Jul. 28, 1998 (DE) .......................................... 198 34 011

(51) Int. Cl.$^7$ ............................................. F04D 29/12
(52) U.S. Cl. ...................... 415/111; 415/113; 415/175; 415/176; 415/231; 277/408; 277/928
(58) Field of Search ................................ 415/111, 112, 415/113, 175, 176, 230, 231, 168.1, 168.2; 277/408, 928

(56) References Cited

U.S. PATENT DOCUMENTS

| | | | | |
|---|---|---|---|---|
| 2,628,852 A | * | 2/1953 | Voytech ...................... 277/408 |
| 2,853,020 A | * | 9/1958 | Hollinger et al. ........... 415/112 |
| 4,439,096 A | * | 3/1984 | Rockwood et al. ......... 415/230 |
| 4,721,311 A | * | 1/1988 | Kakabaker .................. 277/408 |
| 4,979,875 A |   | 12/1990 | Muller et al. |
| 5,336,048 A |   | 8/1994 | Ganzon et al. |
| 5,827,041 A | * | 10/1998 | Charhut ....................... 415/112 |

FOREIGN PATENT DOCUMENTS

GB            1174767         12/1969

* cited by examiner

Primary Examiner—Christopher Verdier
(74) Attorney, Agent, or Firm—Bachman & LaPointe, P.C.

(57) ABSTRACT

A centrifugal pump with a floating ring seal (34) provided in a sealing chamber (32) for pumped fluid and web-like flat pieces arranged in the sealing area (32) between the outer wall and the floating ring seal (34) extending in a longitudinal section approximately parallel to the pump shaft (14). At least one closable ventilation opening (47) is arranged in the head area of the sealing chamber (32), in addition to one blade-like flat piece (60, 60$_a$) which is disposed on the peripheral wall (48) on both sides of the ventilation opening (47). From a cross-sectional point of view, both flat pieces (60, 60$_a$) are inclined towards each other and define an antechamber with a slit (70) which is parallel to the pump shaft (14) at a distance from the peripheral wall. Preferably, the blade-like flat pieces (60, 60$_a$) are fixed to the radial wall (55) and the free blade edge parallel thereto defines a radial slit with the other radial wall.

15 Claims, 2 Drawing Sheets

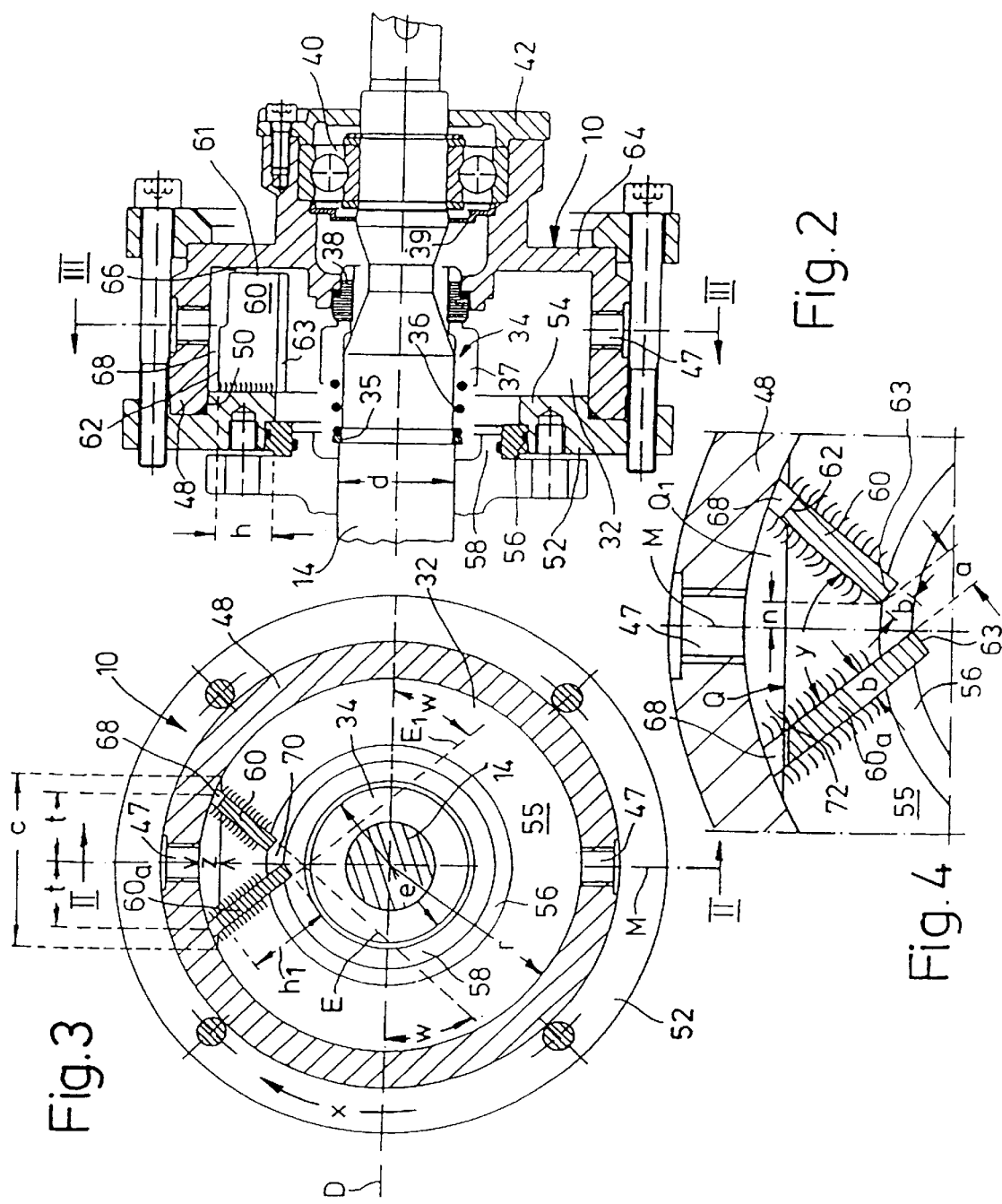

CENTRIFUGAL PUMP WITH A FLOATING RING SEAL

The invention relates to a centrifugal pump with a floating ring seal in a sealing chamber for delivered fluid for a pump shaft and web-like flat portions arranged in the sealing chamber between the outside wall thereof and the floating ring seal and extending in longitudinal section substantially parallel to the pump shaft, wherein arranged in the head region of the sealing chamber is at least one closable vent opening.

A centrifugal pump of that kind is described by way of example in a prospectus of April 1986 from the present applicants relating to the so-called NTT series by means of a sectional view for single-stage models; therein the flat portions are radially formed at the transition of a side surface into the peripheral wall of the sealing chamber. It is intended to permit calming and stabilising of the fluid which is passed around the pump shaft.

EP 0 327 549 B1 shows an annular wall which surrounds the floating ring seal or the pump shaft at a spacing and which has radial ribs projecting therefrom, the ribs extending close to the peripheral wall of the sealing chamber. It is also indicated that radial ribs can be directed from the peripheral wall towards the pump shaft.

In consideration of that state of the art the inventor set himself the aim of improving the means for rotational calming and for gas removal and in so doing simplifying manufacture of such centrifugal pumps.

That object is attained by the teaching set forth in the independent claim; the appendant claims set forth advantageous developments. The scope of the invention also embraces all combinations of at least two of the features disclosed in the description, the drawing and/or the claims.

In accordance with the invention a respective blade-like flat portion extends at the peripheral or outside wall of the sealing chamber on each side of the vent opening; those two flat portions—which are inclined relative to each other in terms of cross-section—delimit between them at a spacing relative to the peripheral wall an antechamber of the vent bore with a gap which is approximately parallel to the pump shaft. Fluid passes therethrough radially into the above-mentioned antechamber in which it spends a residence time in a calmed condition.

It has proven to be desirable for the flat portions—preferably formed from metal material—to be fixed to the outside or peripheral wall or one of the end or radial walls of the sealing chamber, preferably to the radial wall remote from the intake side; in accordance with a further feature of the invention they then project therefrom at a spacing relative to the peripheral or outside wall—forming a gap. In addition their substantially radial free blade edge is also to define with the other radial wall a radial gap.

The ridge gap at the peripheral wall makes it possible for a head chamber to be formed in the antechamber near the ridge, above the level of fluid, extending at both sides beyond the blade-like antechamber boundaries.

It is also preferred for the two flat portions which define the antechamber for the vent opening, which in cross-section reduces or tapers towards the pump shaft, to form with each other a cross-sectional angle which measures between 70° and 90° but preferably about 80°.

In accordance with another feature of the invention moreover a plane which prolongs the flat portion, with the diametral straight line which crosses the center line of the vent opening at a right angle—for a radius of the peripheral wall of about 65 mm—produces an angle of between about 30° and 60° but preferably about 50°. It has also proven advantageous for the flat portions to be arranged in such a way that a plane prolonging them delimits an angle of between 30° and 60°, preferably about 50°, with the diametral straight line crossing the center line of the vent opening at a right angle. That diametral straight line is determined by a radius of the peripheral wall of about 65 mm. Those stipulations favor the cross-sectional shape of the antechamber.

In accordance with the invention the cross-sectional lengths of the two flat portions are different and can be in a ratio to each other as between 3:2 and 3:2.5. In that respect the width of the above-mentioned intake gap should approximately correspond to a sixth of the cross-sectional height of the longer flat portion.

Another aspect of significance is that the flat portion of longer cross-section is arranged ahead of the flat portion of shorter cross-section, in the direction of rotation of the pump shaft, and thereby its base edge can serve as a detachment edge; the flat portion of longer cross-section should extend into a plane which prolongs the cross-section of the other flat portion.

It is also in accordance with the invention for the cross-section of the above-mentioned antechamber to be comparatively small in relation to the cross-section of the sealing chamber, the two preferably being in a ratio of ten to one; the latter gives particularly advantageous results. Even at relatively high pump shaft speeds, the space which occurs above the fluid accommodates the air without any problem.

Further advantages, features and details of the invention will be apparent from the description hereinafter of preferred embodiments and with reference to the drawing in which:

FIG. 2 is a detail from FIG. 1 on an enlarged scale in longitudinal section taken along line II—II in FIG. 3, FIG. 3 is a view in section through FIG. 2 taken along the line III—III therein, and FIG. 4 shows a part of FIG. 3 on an enlarged scale.

Figure 1:
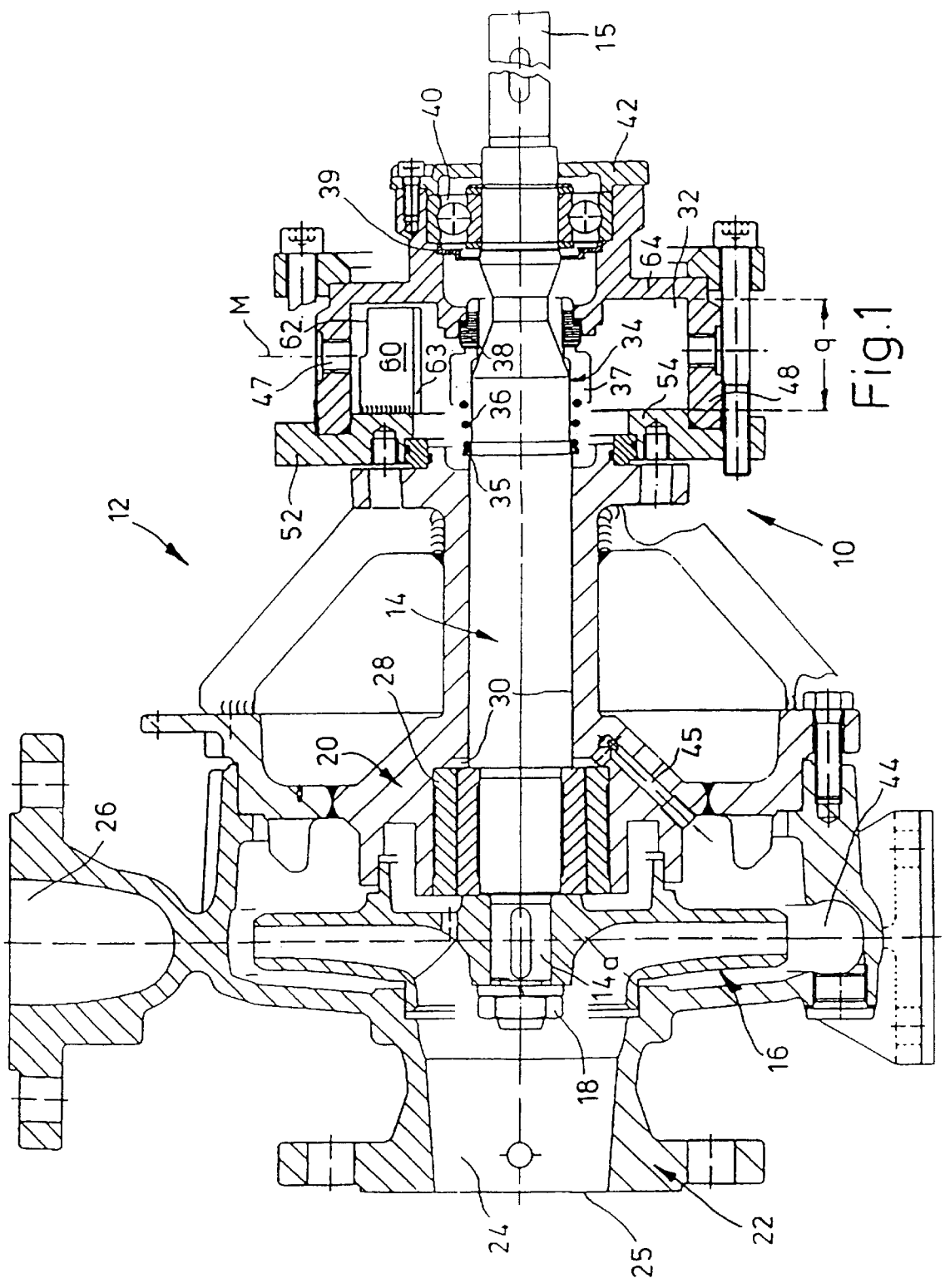
FIG. 1 is a view in longitudinal section through a centrifugal pump.

Referring to FIG. 1, in a bearing carrier housing 10 of a centrifugal pump 12, an impeller 16 is carried on the front stepped end $14_a$ of a pump shaft 14 of a diameter d and is held by a nut 18. The impeller 16 rotates in a spiral housing 22 which is screwed to the bearing carrier housing 10—with the interposition of a housing cover 20 and seals (not shown)—and which includes an intake chamber 24, with the inlet thereof being identified by reference 25 and the outlet thereof by reference 26. Disposed in the proximity of the impeller 6 in the housing cover 20 is a front plain bearing 28.

A cylindrical central opening 30 in the housing cover 20, which accommodates the pump shaft 14, communicates with a sealing chamber 32 in which a rear axial sliding or floating ring seal 34 can be seen. Its rotating floating ring 37 which is loaded by a coil spring 36 which bears against a ring 35 pushed on to the pump shaft 14 or against an annular step forms, with a stationary counterpart ring 38, a sealing gap. The plain bearing components in the illustrated embodiment preferably comprise silicon carbide.

Between the floating ring seal 34 and the end 15 of the shaft the pump shaft 14—after a seal plate 39 of stepped cross-section—is surrounded by a rolling bearing 40 which is covered over by a bearing cover 42.

The flow of fluid which is necessary for functioning of the hydrodynamic plain bearings 28, 34 serves at the same time to carry away the heat which is produced by bearing friction. The cooling/lubricating flow is taken from a side chamber 44 for the impeller 16, it flows through the front plain bearing 28 and it then passes to the central opening 30 which in addition is communicated through a side duct 45 with the side chamber 44.

Considering FIGS. 2 and 3 together makes it clear that the floating ring seal 34 of a diameter e of in this case 54 mm is surrounded by the sealing chamber 32 to which vent openings or bores 47 in a peripheral or annular wall 48 communicate; the associated plugs are not shown in the drawing. In the left-hand half of FIG. 2, the outside or annular wall 48 bears against an annular shoulder 50 of a radial wall 52, out of which there is formed, on the inward side thereof, an annular bead or ridge portion 54 affording the annular shoulder 50. Bearing against the portion 54 is an intermediate ring 56 into which engages on the other hand an annular rib 58 of the housing cover 20.

On respective sides of the vent bore 47 which is at the zenith in FIGS. 2 and 3, projecting from the annular bead or ridge portion 54 in the form of a flat portion is a flat blade 60 and $60_a$ respectively, welded to the radial surface 55 of the portion 54; the welded-on edge of the flat portion or blade extends at a spacing t of about 22 mm relative to the center line M of the vent bore 47. The free edge 61 of the blade 60 forms a radial gap 66 with the oppositely disposed rear radial wall 64 of the bearing housing 10, and the ridge edge 62 of the blade 60 forms a narrow ridge gap 68 with the peripheral or annular wall 48. Moreover the ridge edge 62 is reduced in a stepped configuration approximately at the center line M of the vent bore 47. It can also extend parallel in terms of cross-section to the diametral straight line D, as the left-hand blade $60_a$ in FIG. 4 makes clear.

In an embodiment which is not shown in the drawing, instead of the blades 60, $60_a$ which are welded to the radial surface 55 in the proximity of the intake chamber, the blades 60, $60_a$ are cast in one piece with the rear radial wall so that the above-mentioned radial gap 66 occurs at the radial surface 55 at the intake chamber side.

A structural plane E defined by the blade 60—of a cross-sectional length h of about 23 mm—includes an angle w of about 50° with the diametral straight line D crossing the center line M at a right angle, so that the base edge 63 of the blade 60 faces inclinedly towards the center line M. The other blade $60_a$ of a cross-sectional length $h_1$ of 30 mm in this case is also inclined towards the center line M and its structural plane $E_1$ includes an angle w of the same size with the diametral straight line D. The cross-sectional length $h_1$ corresponds to less than half the radius r of 65 mm for the annular wall 48.

The radius r and the diameter e of the floating ring seal 34 afford the cross-section of the open sealing chamber 32 in this case with for example as follows:

$$\pi \cdot 65^2 - \pi \cdot 54^2/4 = 13.273 \text{ mm}^2 - 2.290 \text{ mm}^2 = 10.983 \text{ mm}^2.$$

In comparison the cross-section of the antechamber 72, such cross-section being defined by the blades 60, $60_a$, is comparatively small; it measures about ten percent of that area.

Due to the different cross-sectional lengths h, $h_1$ of the flat portions or blades 60, $60_a$, there is between the base edges 63 thereof, of a width b of about 5 mm, an intake gap 70 of a width a of about 8 mm and a radial maximum width n which here corresponds to the blade width b.

The blade $60_a$ which leads in the direction of rotation x of the pump shaft 14 projects forwardly at its end to such an extent that it projects somewhat beyond the projection of the base edge 63 of the other blade 60, as FIG. 4 in particular shows. Reference z is to clearly show the apex height of the antechamber 72 above the level of fluid Q, which here measures about one third of the spacing t.

The intake gap 70 which extends approximately over the entire width q of the sealing chamber 32 opens to an antechamber 72 of the vent bore 46, which enlarges away therefrom in cross-section at an angle y of about 80°. Gases from the fluid which is present in the sealing chamber 32 and which is deflected around the base edge 63 of the blade $60_a$ of higher cross-section pass into the antechamber 72. The pump shaft 14 which rotates in the direction indicated by the arrow x and the floating ring seal 34 cause a rotational movement of the fluid, wherein the region of fluid at the annular wall 48 is calmed by the blades 60, $60_a$. A level of fluid which is identified by Q is afforded in the antechamber 72, that level of fluid defining a gas-filled head space $Q_1$ of the base width c. As shown in FIGS. 3 and 4, it passes through the ridge gap 68 in such a way that its ends of a triangular configuration in cross-section project into the sealing chamber 32 outside the blades 60, $60_a$.

What is claimed is:

1. A centrifugal pump with a floating ring seal in a sealing chamber for delivered fluid for a pump shaft and blade-like flat portions arranged in the sealing chamber between a peripheral wall thereof and the floating ring seal and extending in longitudinal section substantially parallel to the pump shaft, wherein arranged in a head region of the sealing chamber is at least one closeable vent opening, characterised in that the blade-like flat portions (60, $60_a$) extend at the peripheral wall (48) on each side of the at least one closable vent opening (47) and the two flat portions are inclined relative to each other in cross-section and at a spacing relative to the peripheral wall to define between them an antechamber (72) with a gap (70) which is substantially parallel to the pump shaft (14).

2. A centrifugal pump as set forth in claim 1 wherein the flat portions (60, $60_a$) are fixed to a wall (52, 54; 64; 48) of the sealing chamber (32).

3. A centrifugal pump as set forth in claim 1 wherein the blade-like flat portions (60, $60_a$) are fixed to a radial wall (52, 54; 64) and have a free blade edge (61) which is substantially parallel thereto and defines with an other radial wall (64; 52, 54) a radial gap (66).

4. A centrifugal pump as set forth in claim 3 wherein the flat portions (60, $60_a$) define with the peripheral wall (48) of the sealing chamber (32) a respective ridge gap (68).

5. A centrifugal pump as set forth in claim 4 wherein a ridge edge (62) of the flat portion (60, 60a), which is close to the peripheral wall (48), is stepped at least once to increase the width of the ridge gap (68) towards the radial gap (66).

6. A centrifugal pump as set forth in claim 1 wherein a cross-sectional angle (y) of the antechamber (72) reduces in cross-section towards the pump shaft (14) and is between about 70° and 90°.

7. A centrifugal pump as set forth in claim 1 wherein a plane (E, $E_1$) which prolongs the flat portions (60, $60_a$) defines an angle (w) of between 30° and 60° with a diametral straight line (D) which crosses a center line (M) of the vent opening (47) at a right angle.

8. A centrifugal pump as set forth in claim 7 wherein the diametral straight line (D) is defined by a radius (r) of the peripheral wall (48) of about 65 mm.

9. A centrifugal pump as set forth in claim 1 wherein the flat portions (60, $60_a$) are of different cross-sectional lengths (h, $h_1$).

10. A centrifugal pump as set forth in claim 9 wherein the flat portions comprise a higher flat portion and a lower flat portion and the cross-sectional length ($h_1$) of the higher flat portion ($60_a$) is in a ratio to the cross-sectional length (h) of the lower flat portion (60) of between about 3:2 and 3:2.5.

11. A centrifugal pump as set forth in claim 10 wherein the width (a) of the intake gap (70) of the antechamber (72) corresponds to approximately one sixth of the cross-sectional length ($h_1$) of the higher flat portion.

12. A centrifugal pump as set forth in claim 10 wherein the flat portion ($60_a$) of longer cross-section precedes the flat portion (60) of shorter cross-section in the direction of rotation (x) of the pump shaft (14).

13. A centrifugal pump as set forth in claim 12 wherein the flat portion ($60_a$) of longer cross-section projects into a plane which prolongs the cross-section of the other flat portion (60).

14. A centrifugal pump as set forth in claim 1 wherein a cross-section of the antechamber (72), is comparatively small with respect to the cross-section of the sealing chamber (32).

15. A centrifugal pump as set forth in claim 14 wherein a cross-sectional ratio of the sealing chamber (32) to the antechamber (72) is between about 12:1 and 6:1.

* * * * *